United States Patent [19]

Dallmann et al.

[11] Patent Number: 4,801,640

[45] Date of Patent: Jan. 31, 1989

[54] POLYESTER FILM HAVING IMPROVED ABRASION RESISTANCE MANUFACTURED FROM PARTICLE-FILLED POLYESTER HAVING NUCLEATING AGENT DISPERSED THEREIN

[75] Inventors: Hermann Dallmann, Wiesbaden; Werner Schaefer, Hofheim-Diedenbergen; Wolfgang Gawrisch, Gau-Bischofsheim; Hartmut Hensel, Schlangenbad, all of Fed. Rep. of Germany

[73] Assignee: Hoechst Aktiengesellschaft, Fed. Rep. of Germany

[21] Appl. No.: 817,238

[22] Filed: Jan. 9, 1986

[30] Foreign Application Priority Data

Jan. 15, 1985 [DE] Fed. Rep. of Germany ......... 350101

[51] Int. Cl.$^4$ .......................... C08K 5/09; C08L 67/00
[52] U.S. Cl. .................................. 524/394; 524/400; 524/425; 524/513; 524/509; 524/512; 524/537; 524/538; 524/539
[58] Field of Search ............... 524/513, 394, 400, 509, 524/512, 537, 538, 539; 525/176, 443, 438

[56] References Cited

U.S. PATENT DOCUMENTS

| | | | |
|---|---|---|---|
| 4,089,828 | 5/1978 | Vasishth | 260/29.6 TA |
| 4,104,261 | 8/1978 | Magosch et al. | 260/873 |
| 4,125,700 | 11/1978 | Graham | 204/159.16 |
| 4,143,094 | 3/1979 | Burzin et al. | 260/873 |
| 4,172,859 | 10/1979 | Epstein | 428/402 |
| 4,292,233 | 9/1981 | Binsack et al. | 260/40 R |
| 4,320,207 | 3/1982 | Watanabe et al. | 521/54 |
| 4,362,839 | 12/1982 | Tonoki et al. | 524/513 |
| 4,396,742 | 8/1983 | Binsack et al. | 525/64 |
| 4,401,792 | 8/1983 | Axelrod et al. | 525/175 |
| 4,417,026 | 11/1983 | Lindner et al. | 525/64 |
| 4,446,276 | 5/1984 | Binsack et al. | 525/64 |
| 4,483,949 | 11/1984 | Semen et al. | 523/514 |
| 4,568,616 | 2/1986 | Seifried et al. | 428/480 |

FOREIGN PATENT DOCUMENTS

0030439 6/1981 European Pat. Off. .
56-139551 10/1981 Japan .

OTHER PUBLICATIONS

M. Woods et al., "Monodisperse Latices: I. Emulsion Polymerization with Mixtures of Anionic and Nonionic Surfactants", 40 *Proceedings of the Paint Research Institute*, 541 (Dec. 1968).

G. Lohr, "The Determination of Particle Size Distribution of Aqueous Dispersions in the Submicroscopic Range by Aerosol Spectroscopy", 43 *Organic Coatings and Polymer Division*, 420 (1980).

*Primary Examiner*—Theodore E. Pertilla
*Attorney, Agent, or Firm*—Gregory N. Clements

[57] ABSTRACT

The invention concerns a polyester film with improved abrasion resistance, dimensional stability, drawability and slip properties. The film is characterized by the fact that it contains 0.005 to 5.0% by weight of organic, preferably hardened or crosslinked, particles with narrow particle size distribution in a range between 0.01 and 5 microns, as well as a nucleating agent in an amount from 0.01 to 10% by weight, both values related to the weight of the polymers which form the film.

15 Claims, No Drawings

POLYESTER FILM HAVING IMPROVED ABRASION RESISTANCE MANUFACTURED FROM PARTICLE-FILLED POLYESTER HAVING NUCLEATING AGENT DISPERSED THEREIN

BACKGROUND OF THE INVENTION

This invention relates to a polyester film with improved dimensional stability, abrasion resistance, drawability and slip properties.

Biaxially or multiaxially oriented polyester films, for example biaxially oriented polyethylene terephthalate film, have good tensile strength, tear resistance, modulus of elasticity transparency, and chemical and thermal resistance. Due to these properties, polyester film has found wide use in a variety of applications, including video, audio, and computer film substrates, as well as in packaging and reprographic products.

Polyester films must meet specific requirements for various applications. One such requirement is a sufficiently low coefficient of friction on the film surface. The rougher the film surface is, the better is the winding behavior and therefore the production yield. In addition to a low coefficient of friction and good mechanical properties, polyester film for magnetic tapes must additionally possess a uniform surface roughness, good abrasion resistance, and dimensional stability.

These requirements can be met by adjusting the polymer recipe or the process parameters during film manufacture. Adjusting the surface topography to satisfy one of these requirements for magnetic tape base film can be achieved by either of two methods.

The first method comprises the addition of inorganic particles to the polyester. The particles may be selected from the group comprising calcium carbonate, silicon dioxide, kaolin, barium sulfate, and titanium dioxide The second method involves creation of "internal particles" by a controlled precipitation of catalyst residues and monomers or oligomers of the polyester during the polyester synthesis.

The use of inorganic particles is likely to lead to the formation of voids during the draw process, at the places where the matrix tears away from the particle. In the further processing of the film, for example during coating, parts of the polymer covering in the area near the surface can loosen and abrade. The non-uniformity of the polyester film surface caused by such abrasion may render the film unsuitable for magnetic tape applications.

In addition, the more or less wide particle size distribution of inorganic particles, as well as the tendency for the formation of agglomerates despite painstaking preparation processes, also have a negative effect upon film quality.

The creation of so-called "internal particles" (catalyst precipitates) of defined size and quantity is extremely difficult from a process-technological point of view.

To improve the adhesion between the polymers and the particles which are added to improve the surface topography of the film, U.S. Pat. No. 4,320,207 describes the inclusion of micronized, crosslinked organic, hardened organic, globular (see DE-OS 33 13 923) spherical particles, with functional groups and narrow particle size distribution, in the polyester, instead of the inorganic particles. Films which contain the crosslinked spherical particles with narrow particle size distribution as well as functional groups for better bonding in the matrix have a defined surface roughness and therefore have good electro-magnetic properties. Since, furthermore, they should have a good slip and excellent transparency, they should be well suited as base films for packaging materials as well as technical applications such as photographic film, magnetic tape, etc., especially since their mechanical properties can be adjusted through the process parameters of the manufacturing process.

However, in practice it has been shown that the films have insufficient abrasion behavior as well as unsatisfactory dimensional stability, and therefore are unsatisfactory for many end uses.

It has also been suggested already (German patent P 34 34 838) that the dimensional stability and abrasion resistance of polyester films be improved by the addition of nucleating agents. Films of these types, however, do not have optimum slip properties.

The object of this invention, therefore, is to make a polyester film with a very uniform surface, which has good slip properties as well as excellent abrasion resistance, improved dimensional stability and drawability.

SUMMARY OF THE INVENTION

In one aspect, the present invention relates to an abrasion-resistant polyester film manufactured from a composition comprising a polyester chemically modified with from 0.005 to 5.0 percent by weight, based upon the total weight of said composition, of crosslinked organic particles covalently bonded to and substantially homogeneously distributed throughout said polyester, said particles having a grain size distribution of from 0.01 to 5.0 microns, wherein the quotient of the weight average particle diameter and the number average particle diameter is 1.1 or less, said chemically-modified polyester additionally containing from 0.01 to 10.0 percent, based upon the weight of the polyester, of a nucleating agent selected from the group consisting of alkali metal salts of ester waxes, alkaline earth salts of ester waxes, alkali metal salts of partially saponified ester waxes, alkaline earth salts of partially saponified ester waxes, ionic copolymers of ethylene and alkali salts of methacrylic acid, alkali metal salts or alkaline earth salts of saturated or unsaturated fatty acids, alkali salts of phenolsulfonic acid, alkaline earth carbonates, and alkaline earth oxides.

In another aspect, the present invention relates to a process for manufacture of an abrasion-resistant polyester film comprising:
(i) mixing (1) a molten thermoplastic polymer which has been chemically modified with from 0.005 to 5.0 percent by weight, based upon the total weight of said polymer, of crosslinked organic particles having a grain size distribution of from 0.01 to 5.0 microns and a quotient of the weight average particle diameter and the number average particle diameter is 1.1 or less with (2) from 0.01 to 10.0 percent, based upon the weight of the polyester, of a nucleating agent selected from the group consisting of alkali metal salts of ester waxes, alkaline earth salts of ester waxes, alkaline earth salts of partially saponified ester waxes, alkali metal salts of partially saponified ester waxes, ionic copolymers of ethylene and alkali salts methacrylic acid, alkali salts of phenolsulfonic acid, alkaline earth carbonates, and alkaline earth oxides, thereby forming a mixture;
(ii) extruding said mixture through a slot die, thereby forming a sheet-like extrudate;

(iii) cooling said extrudate by means of a chill roller, thereby forming cast sheet;

(iv) orienting said cast sheet in at least one direction, thereby forming oriented film; and (v) heat-setting said oriented film at a temperature from 150° to 240° C.

DETAILED DESCRIPTION OF THE INVENTION

As summarized above, the polyester film of this invention contains 0.005 to 5.0% by weight of organic, preferably hardened or crosslinked, particles having a narrow particle size distribution in a range from 0.01 through 5.0 microns, as well as a nucleating agent in an amount from 0.01 to 10% by weight based upon the weight of the thermoplastic polymers forming the film.

Polyester homopolymers and copolymers, mixtures of different polyesters, as well as mixtures or blends of polyesters with other polymers are considered as thermoplastic polyester materials in this invention.

The manufacture of the polyester can be achieved using the interesterification process, for example with the catalytic effect of zinc, calcium, manganese, lithium or germanium salts. The direct esterfication process may alternatively be employed.

Examples of polyesters are mono- or polycondensates from terephthalic acid, isophthalic acid, or 2,6-naphthalene dicarboxylic acid with glycols having 2 to 10 carbon atoms such as polyethylene terephthalate, polybutylene terephthalate, poly-1,4-cyclohexylene dimethylene terepthalate, polyethylene-2,6-naphthalene dicarboxylate or polyethylene-p-hydroxybenzoate.

The copolyesters can also contain adipic acid, sebacic acid, phthalic acid, isophthalic acid, the sodium salt of 5-sulfo-isophthalate, polyfunctional components such as trimellitic acid, as components. The polyester mixtures could comprise, for example, polyethylene terephthalate and polybutylene terephthalate or polyethylene terephthalate and at least one alkali metal salt of a derivative of sulfonic acid, such as sulfoisophthalic acid.

Examples of polymers which can be worked into or mixed into the polyester are polyolefin homopolymers or copolymers such as polyethylene, polypropylene, poly-4-methyl pentene, ethylene vinyl acetate copolymers, which themselves can be saponified, ionomers, polyamides, polycarbonates, polytetrafluorethylene, and polysulfones.

The hardened organic particles contained in the film can comprise melamine/formaldehyde resin, benzoguanamine/formaldehyde resin, phenol/formaldehyde resin, and epoxy resin or an acrylate.

The crosslinked organic particles can contain as components, unsaturated non-ionic monomers such as esters of acrylic and methacrylic acid such as methylmethacrylate and butylacrylate, esters of unsaturated dicarboxylic acids such as maleic acid dialkyl ester, unsaturated vinyl compounds such as styrene, unsaturated nitriles such as acrylonitrile, functional monomers such as unsaturated carboxylic acids, hydroxyl-containing monomers such as hydroxyethyl methacrylate, monomers containing epoxide groups such as glycidyl methacrylate, unsaturated sulfonic acids, and others.

Examples of crosslinking components include diallyl phthalate, divinyl benzene, and others.

Components which carry functional groups and are polymerized in the particles so that they can form covalent bonds between the polyester matrix and the crosslinked particles include hydroxyethylene methacrylate, acrylic acid, and methacrylic acid.

The degree to which the particles are hardened and crosslinked can be varied to a great degree by the composition of especially the hardening and crosslinking components.

It is important that the organic particles are not soluble and not meltable during the polymer synthesis, and remain intact during melting of the polymer, especially in the manufacture of formed articles such as films or in the reclaimation of scrap film.

The organic particles can be manufactured using known processes such as emulsion or suspension polymerization. They can be added to the polymer matrix during the polymer manufacture in the form of aqueous or glycol dispersions or in a concentrate. Addition during the polymer synthesis leads to a particularly good bonding in the matrix as well as good distribution within the polymers themselves.

The organic particles have diameters between 0.01 and 5 microns, preferably from 0.02 to 3.0 microns, with a narrow particle size distribution. The ratio of the weight average of the particle diameter ($D_w$) to the number of the particle diameter ($D_n$) must be less than 1.1. To determine $D_w$ and $D_n$, see U.E. Woods, J.S. Dodge, I.M. Krieger, P. Pierce, Journal of Paint Technology, Vol. 40, No. 527, p. 545 (1968).

According to need, only organic particles of uniform size or mixtures of particles which are very close in size can be used.

The film contains the above-described organic particles in an amount between 0.005 and 5% by weight, preferably from 0.02 to 3% by weight, related to the weight of the film.

Nucleating agents which are employed in the present invention may be organic or inorganic. The organic nucleating agents can be alkali salts or alkaline-earth salts of ester waxes or partially saponified ester waxes, for example montanic acid, ionic copolymers of ethylene and alkali salts of methacrylic acid, alkali metal salts or alkaline earth salts of saturated or unsaturated fatty acids, alkali salts from phenolsulfonic acids, alkali salts or alkaline-earth salts from benzoates or stearates, and sorbitol derivatives.

The inorganic nucleating agents are alkali earth carbonates and oxides such as titanium dioxide and aluminum oxide, talcum and silicates, and boron nitride.

Montanic acid is an acid mixture, which consists primarily of aliphatic monocarboxylic acids having a chain length between 26 and 23 carbon atoms. Suitable montane wax salts contain primarily metals of the first through third primary group of the periodic table, preferably lithium, sodium, potassium, beryllium, manganese, calcium and aluminum as cations. Sodium montanate is preferred. Salts manufactured by reaction of montanic acid with a 0.1 to 1 equivaeent alkali hydroxide or oxide, preferably with 0.25 to 0.9 equivalents sodium hydroxide, are used as partially neutralized montane wax salts.

Suitable montane wax ester salts are obtained by partial esterification of montanic acid with up to 0.90 equivalents, preferably 0.5 to 0.8 equivalents, of bivalent alcohols with 2 to 4 carbon atoms in the aklylene group, and subsequent neutralization with oxides or hydroxides of the metals called for. Diols which are especially suitable are, for example, ethylene glycol, 1,2-propanediol, 1,3-propanediol, 1,3-butanediol, and 1,4-butanediol.

Nucleating agents based on montanic acid, and their uses in films, are described in Japanese patent publication 56/139,551 (see also Chem. Abstracts 96: 53440 g). The transparency and coefficient of friction of films manufactured with the additives mentioned are described in this document.

Surprisingly, however, it has been shown that, using polyester materials with the addition of hardened or crosslinked organic particles and nucleating agents, films can be manufactured which have especially good abrasion resistance as well as improved dimensional stability and drawability, with excellent transparency at the same time. The nucleating agents, preferably in a range between 0.1 and 5.0% by weight related to the weight of the polyester, can be added to the polyester material during or after its manufacture. In practice, it has been shown to be advantageous with regard to optimum dimensional stability and abrasion resistance to add the nucleating agents either in the form of a master batch or to mix it with the dried granulate.

In addition to nucleating agents, the films in this invention can also contain agents for optimizing the slip and glide properties such as inert inorganic particles, which can also be present in colloidal form, residual catalyst particles, etc., as well as other common additives such as antioxidants, antistatic agents, heat stabilizers, dyes, etc.

The film of this invention is manufactured using the extrusion process, whereby the polyester material mixed with the nucleating agent is melted, extruded into a cast film, and quenched on a cool roll. This film is subsequently drawn in the machine direction (MD) and/or transverse direction (TD) at temperatures between the glass transition point of the polymers and 160° C., and with a draw ratio preferably in the range from 2.0 to 6.0, and then heat set at temperatures between 150° C. and 240° C. The number and sequence of the MD and TD draw stages is not predetermined, but is done according to the film requirements. The individual MD and TD draw procedures can be done in 1 or more stages. A simultaneous MD and TD drawing is also possible.

The films resulting from the draw processes can have strength in only one direction (monoaxially drawn), can have mechanical properties which are balanced in both directions (balanced films) or can have special strengths in the TD and/or MD direction (tensilized or supertensilized films).

The films can also have two or more layers, whereby polyester materials having different nucleation or recipes can be joined by coextrusion or lamination into multi-layer films; furthermore, polyester materials having different nucleation and/or recipes can be joined with non-nucleated polyester materials in the same way. The advantages of the various nucleating agents and additives can be specifically applied to the individual area of application of the film as a result of this layered structure. The configuration of the coextruded films can be either symmetrical or unsymmetrical.

In using the process as described above, it is particularly surprising that no increased crystallite formation as a result of the nucleating agent is observed when the polyester melt is cooled on the cooling roll. The density of the cast film is less than 1.34 g/cm$^3$, such that the cast film can be subjected to the subsequent draw processes. Furthermore, no negative influences by the nucleating agent nor by the nuclei for the formation of crystallites were observed during the film drawing. These nuclei do not have any effect until the heat setting process step, at which stage they strongly reduce the shrinking tendency of the film.

Within the individual draw stages, there is a certain relationship between density, orientation and crystallite size and/or number. This relationship can be regulated by the addition of nucleating agents to the film.

Surprisingly, the mechanical property profile of the film is not worsened.

In addition to the improved abrasion resistance, dimensional stability and drawability of the film, further advantages of this invention are that in drying the polyester granulate at higher temperatures due to the addition of the nucleating agent, a reduced tendency of the polyester particles to stick was observed. As a result of this, the throughput can be increased in this step. Using this invention, therefore, higher production speeds can be achieved with the same film quality, and profitability is therefore improved.

The surface properties and surface roughness can be influenced by additional coating of the film with solutions or dispersions. Such additional coatings may contain, among other things, crosslinkable, hardenable or already hardened or crosslinked substances and/or particles. Examples for this are copolyesters, polyurethanes, heat-hardenable acrylic acid derivatives, polysiloxanes, styrene-butadiene-rubbers or substances, which - as described above - can be added to the polymers.

The dispersions or solutions ca contain organic additives such as sodium montanate, fatty acid esters, silane or siloxane coupling reagents, as well as inorganic additives such as colloidal silicon dioxide and titanium dioxide particles, to improve the properties of the applied coating.

The coating can be done in an in-line process either between the draw stages or after orientation.

EXAMPLES

The following examples illustrate and advantage of the present invention As examples, they are illustrative only and are not intended to describe the full scope of the invention.

In the following examples, a polyester polymer is used which contains finely divided, crosslinked acrylic particles, which have a narrow particle size distribution and which are manufactured by emulsion polymerization. The acrylic particles were added during the manufacture of the polyester, by means of dispersions into the polymer.

The abrasion behavior of the film was determined using a measurement unit, in which a 12.5 mm wide film band with a constant tension (1 N) is drawn first across a rubber cleaning roll, then over a stationary deflection pin from a cassette, and subsequently is led across two rubber rolls which serve as measurement rolls, and finally is wound up. The amount of abraded material left on the rubber rolls was evaluated according to a scale of 1 to 5, or from "very good" to "inferior".

EXAMPLE I 0.4% by weight of sodium montanate (based on the weight of the polyester) was added to a polyethylene terephthalate polymer having 1000 ppm crosslinked organic particles comprising 80 parts by weight of methyl methacrylate, 20 parts by weight of butyl acrylate, 5 parts by weight of hydroxymethyl acrylate and 2.5 parts by weight of divinyl benzene. The crosslinked organic particles were manufactured by emulsion polymerization, and had an average particle diameter of 0.65 micron. The mixture was melted, formed into a film using a slot die, and quenched to an amorphous film on a high-gloss-polished cool roll. The cast film was then biaxially drawn in a step-by-step process, and a surface draw ratio of λ=13 was reached. The biaxially oriented, approximately 14.4 microns thick film was then heat set at 195° C.

COMPARATIVE EXAMPLE I

As in Example I, a step-by-step biaxially oriented film was manufactured, without the addition of sodium montanate.

The films produced in Example I and Comparative Example I were evaluated for various properties including shrinkage, elongation, abrasion resistance and haze. The results are set forth in Table I.

TABLE I

| | Shrinkage | | | | Draw Tension at 5% Elongation | | E-Modulus ($N/mm^2$) | | Abrasion Resistance | Haze % |
|---|---|---|---|---|---|---|---|---|---|---|
| | 105° C. 30 min | | 150° C. 15 min | | | | | | | |
| | MD | TD | MD | TD | MD | TD | MD | TD | | |
| Example I | 0.5 | 0.1 | 2.0 | 0.2 | 110 | 100 | 4700 | 5200 | 1 | 6.2 |
| Comparative Example I | 0.8 | 0.4 | 3.0 | 1.3 | 110 | 100 | 4800 | 5200 | 4–5 | 5.5 |

EXAMPLE II

As in Example I, a film was formed on a high-gloss polished roll having a surface temperature of 54° C. The amorphous cast film was then drawn in a step-by-step process at 117° C. and a surface draw ratio of λ=4.7 in the MD direction, and at 95° C. with a TD draw ratio of λ=3.6; it was then heat set at 195° C.

COMPARATIVE EXAMPLE II

As in Example II, a step-by-step biaxially oriented film was manufactured, without the addition of sodium montanate.

The films produced in Example II and Comparative Example II were evaluated for various properties, including shrinkage, abrasion resistance, haze, and the coefficient of kinetic friction. The results are set forth in Table II.

TABLE II

| | Shrinkage at 105° C. 30 min. | | Shrinkage at 150° C. 15 min. | | Abrasion Resistance | Haze % | | Sliding Friction Coefficient | |
|---|---|---|---|---|---|---|---|---|---|
| | MD | TD | MD | TD | | MD | TD | MD | TD |
| Example II | 0.55 | 0 | 2.0 | 0 | 1 | 5 | 3 | 0.35 | 0.35 |
| Comparative Example II | 0.7 | 0.2 | 3.0 | 1.9 | 4 | 4 | 3 | 0.50 | 0.55 |

Coefficient of Kinetic friction according to DIN 53375 alkali metal salts of ester waxes, alkaline earth salts of ester waxes, alkali metal salts of partially saponified ester waxes and alkaline earth salts of partially saponified ester waxes.

2. The film of claim 1 wherein said polyester is chemically modifed with from 0.02 to 3.0 percent by weight, based upon the total weight of said composition, of said cross-linked organic particles having a grain size distribution of from 0.02 to 3.0 microns; and wherein said nucleating agent is sodium montanate.

3. The film of claim 1 wherein said organic particles are based on a resin selected from the group consisting of melamine/formaldehyde resin, benzoguanamine/formaldehyde resin, phenol/formaldehyde, an epoxy resin and an acrylate.

4. The film of claim 3 wherein said organic particles are based on an epoxy resin.

5. The film of claim 3 wherein said organic particles are based on an acrylate.

6. The film of claim 3 wherein said organic particles are cross-linked and have been prepared using divinyl benzene as a crosslinking agent.

7. The film of claim 3 wherein said organic particles are cross-linked and have been prepared using diallyl phthalate as a crosslinking agent.

8. The film of claim 6 wherein said organic particles have been prepared using at least one component selected from the group consisting of hydroxyethyl methacrylate, acrylic acid, and methacrylic acid.

9. The film of claim 7 wherein said organic particles have been prepared from at least one component selected from the group consisting of hydroxyethyl methacrylate, acrylic acid, and methacrylic acid.

10. The film of claim 1 wherein said polyester film is manufactured from homo- or copolycondensates of terephthalic acid or isophthalic acids with glycols having 2 to 10 carbon atoms.

11. The film of claim 1 wherein said polyester film is manufactured from polyethylene terephthalate.

12. The film of claim 1 wherein said organic particles are prepared via emulsion or suspension polymerization.

13. The film of claim 1 wherein said polyester comprises at least two different polyesters.

14. The film of claim 1 further comprising at least one other thermoplastic polymer selected from the group consisting of polyethylene, polypropylene, poly-4-

We claim:

1. An abrasion-resistant polyester film manufactured from a composition comprising a polyester chemically modified with from 0.005 to 5.0 percent by weight, based upon the total weight of said composition, of crosslinked organic particles covalently bonded to and substantially homogeneously distributed throughout said polyester, said particles having a grain size distribution of from 0.01 to 5.0 microns, wherein the quotient of the weight average particle diameter and the number average particle diameter is 1.1 or less, said chemically-modified polyester additionally containing from 0.01 to 10.0 percent, based upon the weight of the polyester, of a nucleating agent selected from the group consisting of methylpentene, ethylene vinyl acetate copolymers, polyamides, polycarbonates, polysulfones, and polytetrafluoroethylene.

15. The film of claim 1 further comprising one or more inorganic particles selected from the group consisting of calcium carbonate, silicon dioxide, kaolin, barium sulfate, and titanium dioxide.

* * * * *